United States Patent

Utsunomiya et al.

[15] 3,688,156

[45] Aug. 29, 1972

[54] ELECTRON BEAM DEFLECTION SYSTEM UTILIZING A YOKE HAVING A PLURALITY OF SEPARATE WINDINGS TOROIDALLY WOUND THERON

[72] Inventors: Kimitake Utsunomiya, Tokyo; Hitoshi Yasuda, Saitama, both of Japan

[73] Assignee: Sony Corporation, Tokyo, Japan

[22] Filed: March 17, 1970

[21] Appl. No.: 20,196

[30] Foreign Application Priority Data

March 17, 1969 Japan ......................44/20661

[52] U.S. Cl. ..............315/276 D, 315/13 C, 335/213

[51] Int. Cl. ...............................................H01j 29/70

[58] Field of Search..........315/13 C, 276 DC, 30, 31; 313/76; 335/213

[56] References Cited

UNITED STATES PATENTS

| | | | |
|---|---|---|---|
| 2,661,443 | 12/1953 | Smith | 315/276 DC |
| 2,872,617 | 2/1959 | Stark et al. | 315/30 |
| 2,881,341 | 4/1959 | Schlesinger | 335/213 X |
| 2,344,736 | 3/1944 | Schade | 315/276 DC |
| 3,500,114 | 3/1970 | Sawai | 315/13 C |
| 3,548,249 | 12/1970 | Yoshida et al. | 315/13 C |

*Primary Examiner*—Carl D. Quarforth
*Assistant Examiner*—J. M. Potenza
*Attorney*—Lewis H. Eslinger, Alvin Sinderbrand and Curtis, Morris & Safford

[57] ABSTRACT

In a color television receiver having a color cathode ray tube and an electron beam deflection yoke receiving the neck portion of the tube for deflection the electron beams in the tube to scan its color phosphor screen, the yoke has a plurality of separate windings toroidally wound in a generally axial direction and in a predetermined spaced relation about the periphery of an annular magnetic core, and the individual windings are interconnected to form three groups of windings, two of which are respectively connected to a horizontal deflection current source and to a vertical deflection current source and the third of which is connected to both the horizontal and vertical deflection current sources whereby the windings establish horizontal and vertical magnetic fields within the yoke and the cathode ray tube for accurate scanning of the screen by the electron beams.

8 Claims, 17 Drawing Figures

INVENTOR
KIMITAKE UTSUNOMIYA
HITOSI YASUDA
BY
ATTORNEYS

INVENTOR.
KIMITAKE UTSUNOMIYA

HITOSHI YASUDA

BY

ATTORNEYS

INVENTORS
KIMITAKE UTSUNOMIYA
HIROSHI YASUDA

BY

ATTORNEYS

INVENTOR.
KIMITAKE UTSUNOMIYA
HITOSHI YASUDA
BY
ATTORNEYS

INVENTOR
KIMITAKE UTSUNOMIYA
HITOSHI YASUDA

BY ATTORNEYS

INVENTORS
KIMITAKE UTSUNOMIYA
HITOSHI YASUDA
BY
ATTORNEYS

INVENTOR.
KIMITAKE UTSUNOMIYA
HITOSHI YASUDA

BY

ATTORNEYS

INVENT...
KIMITAKE ...
HITOSHI ...
...RNEYS

ELECTRON BEAM DEFLECTION SYSTEM UTILIZING A YOKE HAVING A PLURALITY OF SEPARATE WINDINGS TOROIDALLY WOUND THERON

This invention relates generally to color television receivers, and more particularly to an electron beam deflection system for color cathode ray tubes.

Color cathode ray tubes in conventional color television receivers typically utilize an electron gun assembly to produce three electron beams corresponding to the colors of red, green and blue and which are passed through deflection magnetic fields established by a deflection coil device or yoke to effect scanning of the phosphor screen of the tube by the electron beams. The electron beams pass from the electron gun assembly through the deflecting magnetic fields in a predetermined spaced angular relationship so as to converge at a point where the beams pass through an apertured grill or shadow mask adjacent the screen and thence diverge to impinge on the respective phosphors of the screen. Due to the angular relationship and spacing of the beams as they pass through the deflection coil device there is a relative deviation of the rasters of the beams and also a difference in the sizes of the rasters of the beams so that misconvergence results when the beams are deflected away from the central portion of the screen.

Deflection coil devices previously proposed for use in color television receivers utilize a generally annular magnetic core member or yoke having overlapping windings on the periphery of the core which are adapted to be connected to horizontal and vertical deflection current sources to produce the horizontal and vertical deflection magnetic fields. These devices in addition to producing misconvergence of the electron beams generally require a large number of windings which increase the overall size of the yoke and require relatively large deflecting currents. Moreover, the overlapping windings on these yokes are relatively complex and thus they are difficult to produce accurately and efficiently.

Accordingly, it is an object of the present invention to produce deflecting magnetic fields for electron beam scanning in color cathode ray tubes while maintaining proper convergence of the beams.

It is a further object of the present invention to deflect electron beams in a color cathode ray tube and yet maintain the relative size and positions of the electron beam rasters with respect to one another.

It is a still further object of the present invention to provide a relatively inexpensive and simply constructed electron beam deflection yoke for color cathode ray tubes.

In accordance with an aspect of this invention, an electron beam deflection system for color cathode ray tubes having a color phosphor screen and an electron gun assembly for producing electron beams to scan the screen, comprises a yoke member adapted to receive the neck portion of the cathode ray tube and including an annular magnetic core around which there are wound, in a generally axial direction, a plurality of separate toroidal windings in a predetermined circumferentially spaced pattern. The individual windings are interconnected to form three groups of windings, connected to sources of horizontal and vertical deflection currents. One of the groups of windings is connected to both the horizontal and vertical deflection current sources while the other two groups of windings are respectively connected to the horizontal deflection current source and the vertical deflection current source to establish horizontal and vertical magnetic fields within the yoke and the cathode ray tube for accurate convergence and scanning of the electron beams. The specific spacing pattern and interconnections of the separate windings produce a predetermined distribution of the magnetic field intensity within the yoke to assure this accurate scanning and convergence of the electron beams. Annular spacing members are mounted on the magnetic core and have a plurality of projections of different widths corresponding to the predetermined spacing between the windings. Each of these projections is adapted to extend between respective adjacent windings to maintain the predetermined spacing pattern of the windings.

Construction of an electron beam deflection system in this manner and in accordance with this invention, facilitates the production of relatively small deflection yoke units having small windings which readily and positively attain the desired predetermined magnetic field distributions within the cathode ray tube. The resulting yoke can be readily produced and is of smaller dimensions than conventional deflection yokes having overlapping horizontal and vertical deflection windings. Moreover, the desired deflection magnetic fields can be varied by adjusting the positions of the toroidal windings on the magnetic core and these deflection magnetic fields can be produced with smaller deflection currents than required for prior deflection yokes.

The above, and other objects, features and advantages of this invention, will be apparent in the following detailed description of illustrative embodiments of this invention which is to be read in connection with the accompanying drawings wherein.

Figure 1:
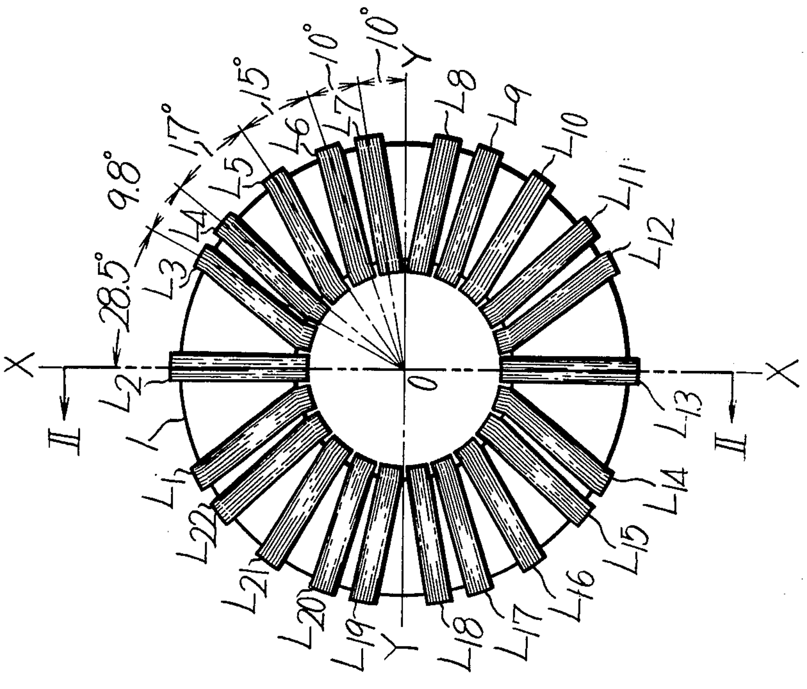
FIG. 1 is an end view of a deflection yoke according to an embodiment of the present invention, as viewed in the direction of the arrows I—I on FIG. 2.
Figure 2:
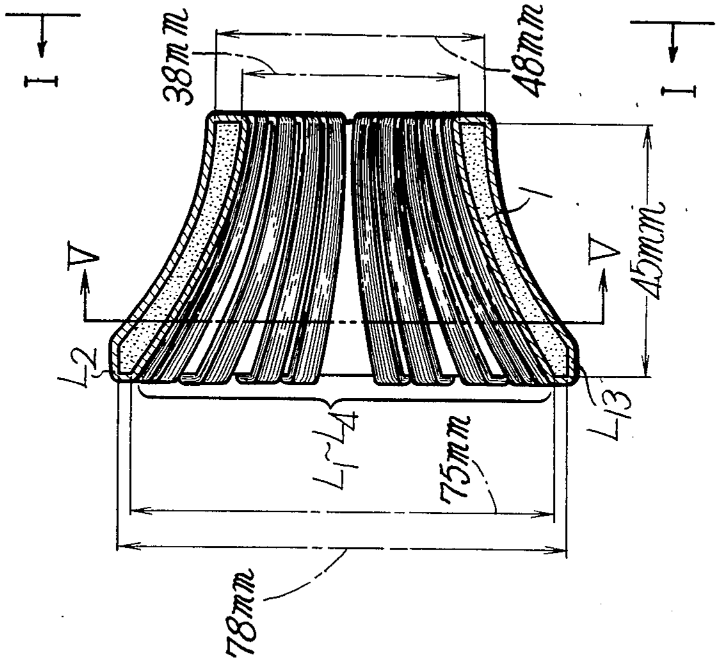
FIG. 2 is a sectional view taken on line II—II of FIG. 1.

Referring to the drawings in detail, and initially to FIGS. 1 and 2 thereof, it will be seen that the electron beam deflection system embodying the present invention, as there shown, comprises an electron beam deflection yoke having a plurality of separate windings $L_1$ - $L_{22}$ toroidally wound about the periphery of an annular magnetic core 1 which is adapted to receive the neck portion of a color cathode ray tube. Windings $L_1$ to $L_{22}$ are positioned in a predetermined spaced relation about core 1 and they are electrically connected with each other and with sources of horizontal and vertical deflection currents to produce horizontal and vertical magnetic fields within core 1 and its associated cathode ray tube. Such magnetic fields are adapted to deflect the electron beams produced by the electron gun assembly of the tube for accurate convergence of the beams at the shadow mask of the tube which these beams are made to scan the tube's color phosphor screen with minimal distortion.

The deflection yoke illustrated in the drawings is constructed for use in a 10 inch color television receiver sold by the Sony Corporation under the trademark "Trinitron" and includes 22 separate windings $L_1$ - $L_{22}$. While 22 such windings are shown in the drawings for the described embodiment, it is contemplated that the number of such windings may be advantageously varied between 16 and 28 depending upon the size of the cathode ray tube to which the yoke is to be applied and the scanning accuracy desired.

Figure 3:
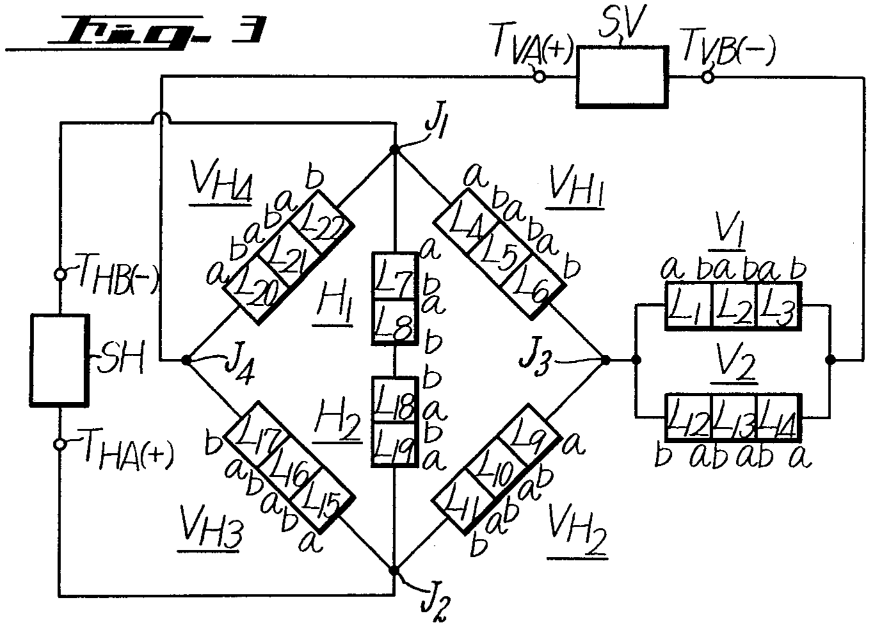
FIG. 3 is a circuit diagram illustrating the connections of the various yoke windings to each other and to the sources of the horizontal and vertical deflection currents.
Figure 5:
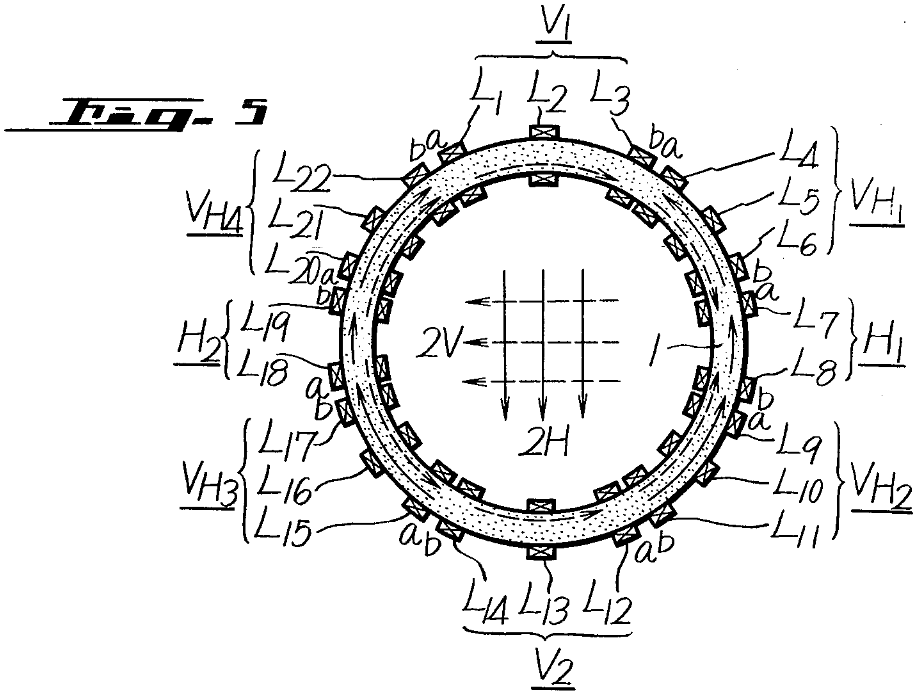
FIG. 5 is a sectional view taken on line V—V of FIG. 2.

Windings $L_1$ to $L_{22}$ are wound in the same direction and have corresponding ends *a* and *b* at which the windings are connected, as shown in the circuit diagram in FIG. 3, with each other and with a horizontal deflection current source SH and a vertical deflection current source SV, to produce magnetic fluxes within core 1 indicated by the full and broken lined arrows 2H and 2V appearing on FIG. 5. The vertically directed magnetic fluxes 2H establish the horizontal deflection magnetic field, and the horizontally directed magnetic fluxes 2V establish the vertical magnetic deflection field, and these fields vary cyclically in direction and intensity to deflect the electron beams in a scanning pattern on the color phosphor screen of the cathode ray tube.

These fluxes are created by the deflection currents in windings $L_1$ to $L_{22}$, which are interconnected in separate groups or sets of windings, for example, horizontal deflection windings H receiving only the horizontal deflection current, vertical deflection windings V receiving only the vertical deflection current, and combined horizontal and vertical deflection windings VH receiving both the vertical and horizontal deflection currents.

The combined deflection windings VH include four sets of windings $VH_1$ to $VH_4$ which form the four sides of a bridge circuit and which include windings $L_4$ to $L_6$ in set $VH_1$, $L_9$ to $L_{11}$ in set $VH_2$, $L_{15}$ to $L_{17}$ in set $VH_3$, and $L_{20}$ to $L_{22}$ in set $VH_4$, with the windings in each set being connected in series at their respective ends *a*, *b*, as shown in FIG. 3. The horizontal deflection windings H include two sets or groups of windings $H_1$ and $H_2$ respectively including windings $L_7$ and $L_8$ and windings $L_{18}$ and $L_{19}$. The sets of windings $H_1$ and $H_2$ are connected in series between the opposed bridge connection points or junctions $J_1$ and $J_2$ between winding sets $VH_1$ and $VH_4$ and between winding sets $VH_2$ and $VH_3$, respectively. These connections points $J_1$ and $J_2$ are respectively connected to the negative terminal $T_{HBC(-)}$ and the positive terminal $T_{HBC(+)}$ of horizontal deflection current source SH to supply horizontal deflection current to winding sets $H_1$, $H_2$ and $VH_1$ to $VH_4$.

Vertical deflection windings V include two sets $V_1$ and $V_2$ which respectively include series connected windings $L_1$ to $L_3$ and series connected windings $L_{12}$ to $L_{14}$. The winding sets $V_1$ and $V_2$ are connected in parallel between the bridge junction $J_3$ formed between sets $VH_1$ and $VH_2$ and the negative terminal $T_{VB(-)}$ of vertical deflection current source SV. The deflection circuit is completed by the connection of the positive terminal $T_{VA(+)}$ of current source SV with the remaining bridge junction $J_4$ formed between windings sets $VH_3$ and $VH_4$ so that the winding sets $V_1$, $V_2$ and $VH_1$ to $VH_4$ are each supplied with vertical deflection current.

It is thus seen that, by the bridge circuit illustrated in FIG. 3, only horizontal deflection current is supplied to winding sets $H_1$ and $H_2$ and only vertical deflection current is supplied to winding sets $V_1$ and $V_2$ whereas both horizontal and vertical deflection currents are supplied to winding sets $VH_1$ to $VH_4$. By appropriately positioning the various windings in each of these sets about magnetic core 1 in the manner illustrated in FIG. 1 the magnetic fields 2H and 2V produced within the yoke and its associated cathode ray tube are of accurately predetermined configuration so that the deflection of the electron beams within the cathode ray tube may be precisely controlled to eliminate misconvergence and deviations between their respective rasters.

Misconvergence of the beams is avoided during scanning by selecting and maintaining a predetermined spacing between adjacent windings around the annular magnetic core. In the embodiment of the invention illustrated in FIG. 1, the vertical deflection windings $L_2$ and $L_{13}$ are diametrically opposed in a plane X—X passing through the axis of core 1, and the remaining windings are distributed on either side of this axis in mirror image relation.

To facilitate the description of the winding spacing, a second plane Y—Y is shown in FIG. 1 which extends through the axis 0 of core 1 perpendicularly to plane X—X and which, in cooperation with plane X—X, divides the yoke into quadrants containing similar winding spacings or arrays. In any one quadrant, for example the quadrant containing windings $L_2$ to $L_7$, the spacing between adjacent windings may then be defined with respect to the angles formed between the various windings and between the windings and the axes X—X and Y—Y. In the described embodiment the angles required to assure accurate electron beam convergence and avoidance of deviations between the rasters of the beams are respectively 28.5° between plane X—X and the center of winding $L_3$, 9.8° between $L_3$ and $L_4$, 17° between $L_4$ and $L_5$, 15° between $L_5$ and $L_6$, 10° between $L_6$ and $L_7$ and 10° between $L_7$ and plane Y—Y. As mentioned above and as clearly shown in the drawings, the remaining windings are positioned in similar angular relationships within the respective quadrants.

Figure 4:
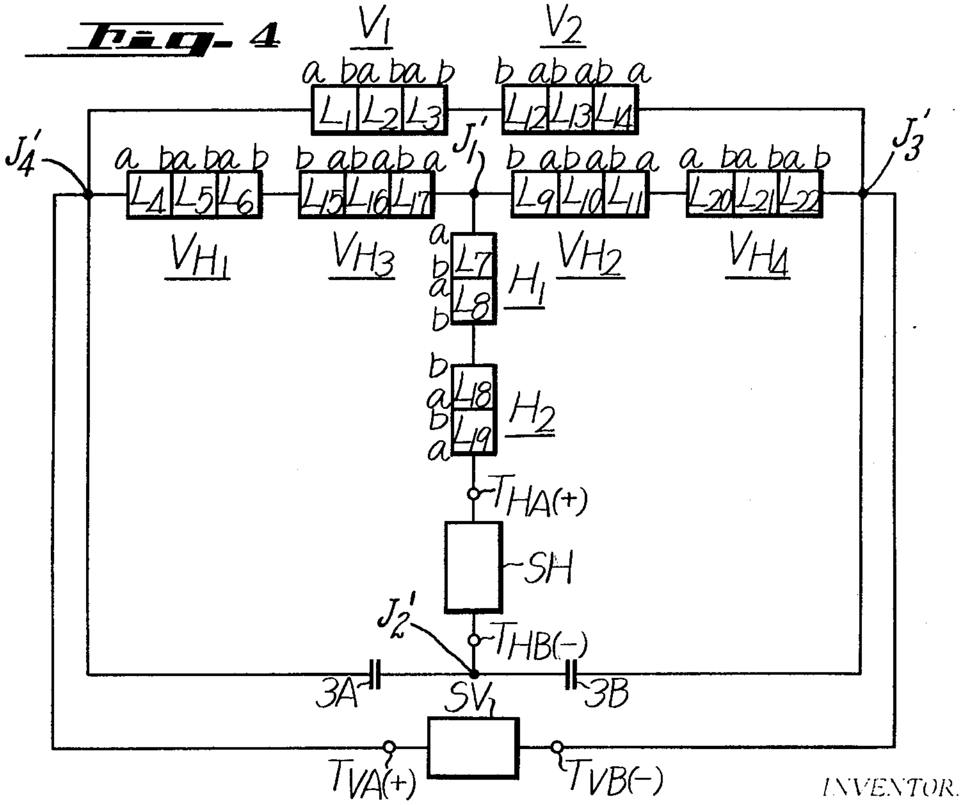
FIG. 4 is another circuit diagram showing winding connections for use with the deflection yoke of the present invention.

FIG. 4 illustrates another circuit arrangement for the windings of a yoke according to the present invention wherein the windings $L_1$ to $L_{22}$ are distributed among winding sets $V_1$, $V_2$, $H_1$, $H_2$, and $VH_1$ to $VH_4$ in the same manner as in the embodiment of FIG. 3. However, in FIG. 4 the series connected sets $VH_1$ and $VH_3$ and the series connected sets $VH_2$ and $VH_4$ form two sides of a bridge circuit having capacitors 3A and 3B forming the other two sides thereof. The sets of windings $H_1$ and $H_2$ are connected in series with horizontal deflection current source SH between the opposed bridge connection points or junctions $J_1'$ and $J_2'$ between capacitors 3A, 3B and between winding sets $VH_2$ and $VH_3$, respectively. On the other hand, winding sets $V_1$ and $V_2$ are connected in series in a circuit that is in parallel with winding sets $VH_1$ to $VH_4$ and this parallel circuit is connected to the current source SV at opposing connection points or junctions $J_3'$ and $J_4'$. The horizontal and vertical magnetic fields 2H and 2V resulting from this circuit are similar to those obtained with the circuit shown in FIG. 3 and similarly assure accurate convergence of the electron beams during scanning of the screen by the beams.

By constructing an electron beam deflection yoke in accordance with the present invention, the relative size and complexity of the yoke are substantially reduced, while proper convergence of the electron beams is maintained during scanning of the screen. For example, a yoke in accordance with the above described embodiments of this invention is adapted for a color picture tube measuring 10 inches diagonally across its screen and being of the type sold under the trademark "-Trinitron" by the Sony Corporation may have each of its twenty-two windings $L_1$ to $L_{22}$ formed of 25 windings on core 1 of a bundle of conductive wires of 0.32 mm. diameter. The mentioned "Trinitron" color picture tube employs a screen consisting of vertical red, green and blue phosphor strips arranged sequentially across the screen and an apertured grill having horizontally spaced, vertical slits each corresponding to an array or set of the phosphor strips, with the red, green and blue beams being emitted in a horizontal plane. With the windings $L_1$ to $L_{22}$ being constituted, as aforesaid, and angularly spaced as described above with reference to FIG. 1, misconvergence of the beams is substantially avoided in the mentioned "Trinitron" tube, while the yoke is substantially smaller than those previously employed with extensive overlapped windings. In addition, the strength of the deflection currents required for the operation of the present yoke is substantially reduced as compared to prior yokes and the desired horizontal and vertical magnetic deflection fields of predetermined intensity distribution are readily achieved.

In order to maintain precisely controlled horizontal and vertical magnetic deflection fields with the yoke according to the present invention, it is necessary to accurately define the spacings and angular relationships between windings $L_1$ to $L_{22}$ and to maintain this spacing after the deflection yoke has been mounted on a color cathode ray tube.

FIGS. 6 to 10 illustrate annular separator or spacer members, each of which is formed to accurately define the predetermined spacing between adjacent windings and to retain the windings in this position on the magnetic core.

Figures 6A, 6B:
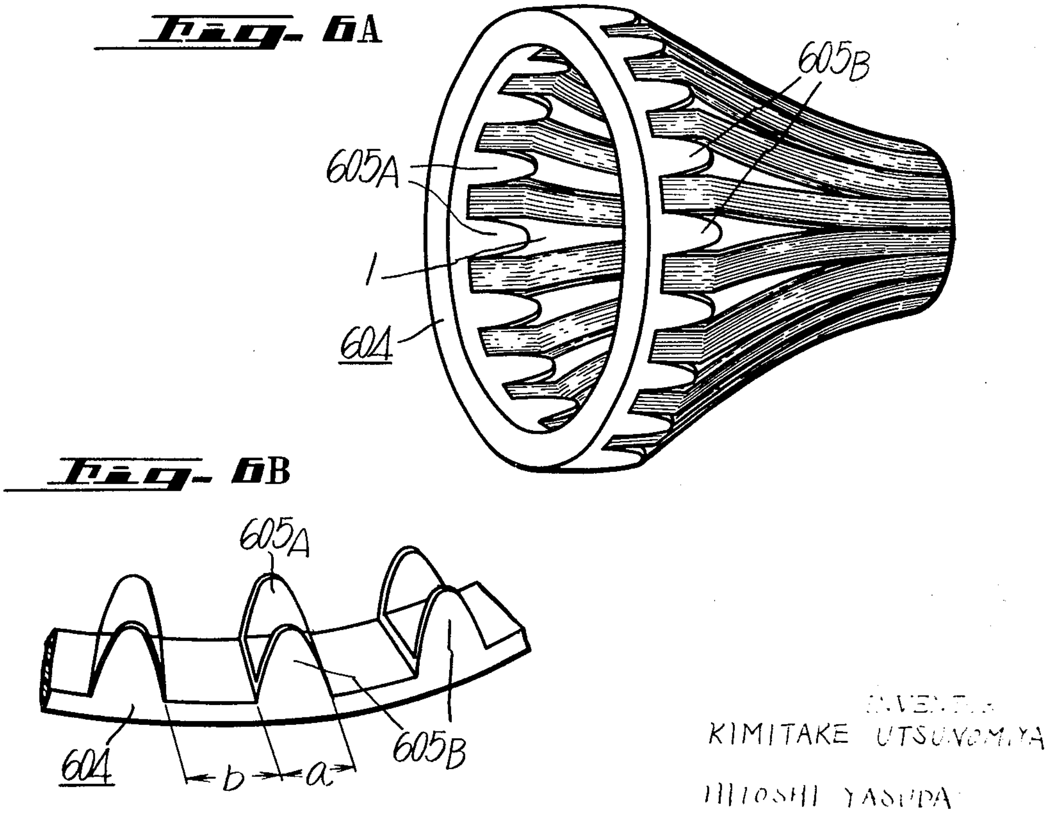
FIG. 6A is a perspective view of the deflection yoke of the present invention provided with an annular spacer member for maintaining the predetermined spacing pattern of the yoke windings.
FIG. 6B is a partial perspective view of the spacer member illustrated in FIG. 6A.

FIGS. 6A and 6B illustrate one embodiment of a separator or spacer member which is formed of a plastic material with an annular base 604 having a plurality of pairs of projections 605A and 605B. Each pair of projections has a width *a* corresponding to the particular spacing between an associated pair of windings $L_1$ to $L_{22}$ and they are spaced from their adjacent pairs of projections by a distance *b* corresponding to the width of each winding. As seen in FIG. 6A, annular base plate 604 is mounted on the marginal edge of the larger open end portion of annular magentic core 1 so that projections 605A and 605B extend over the inner and outer surfaces, respectively, of the core between adjacent windings $L_1$ and $L_{22}$ to define and maintain the predetermined spacings therebetween.

Figure 7A:
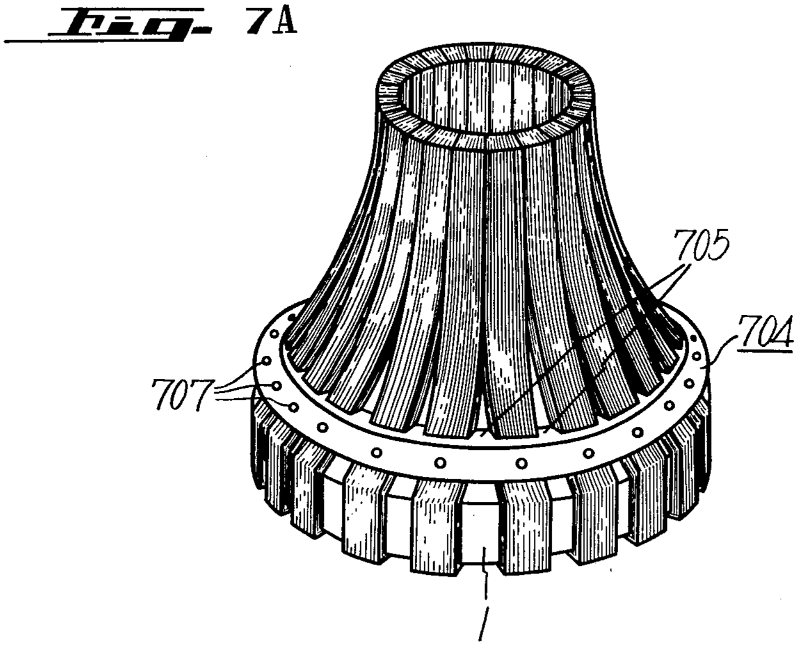
FIG. 7A is a perspective view of the deflection yoke of the present invention in conjunction with another embodiment of the annular spacer member.
Figure 7B:
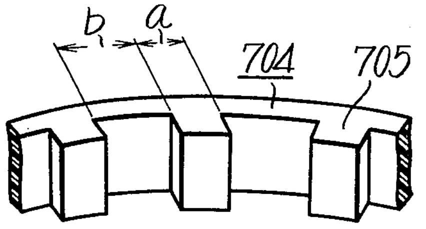
FIG. 7B is a partial perspective view of the spacer illustrated in FIG. 7A.

FIGS. 7A and 7B illustrate another embodiment of an annular separator or spacer member 704 which is also made of a plastic material. Spacer 704 is in the form of a ring having projections 705 formed on the inside thereof and is mounted about the magnetic core 1 and windings $L_1$ to $L_{22}$. The projections 705 extend inwardly between adjacent windings to maintain a predetermined spacing therebetween. As in the prior embodiment, the widths *a* and the spacings *b* of projections 705 are selected to correspond respectively to the desired spacing between adjacent projections and the width of each winding. In addition, however, a plurality of terminals 707 are provided on the exterior surface of the spacer 704 for interconnection of the windings $L_1$ to $L_{22}$ with each other and with current sources SV and SH in accordance with either of the circuit diagrams of FIGS. 3 and 4.

Figure 8A:
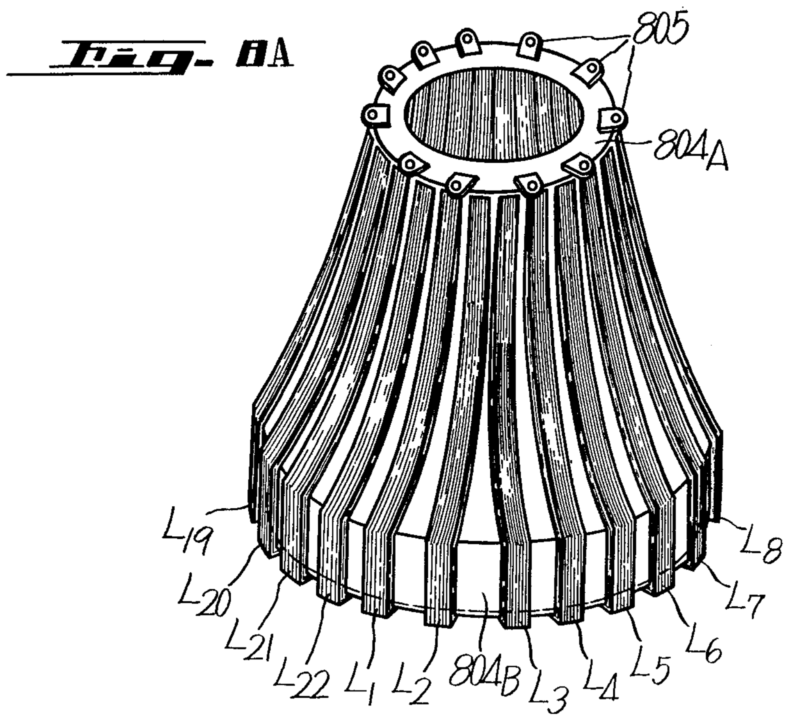
FIG. 8A is a view similar to FIG. 7A of the deflection yoke but showing still another embodiment of the spacer member.
Figure 8B:
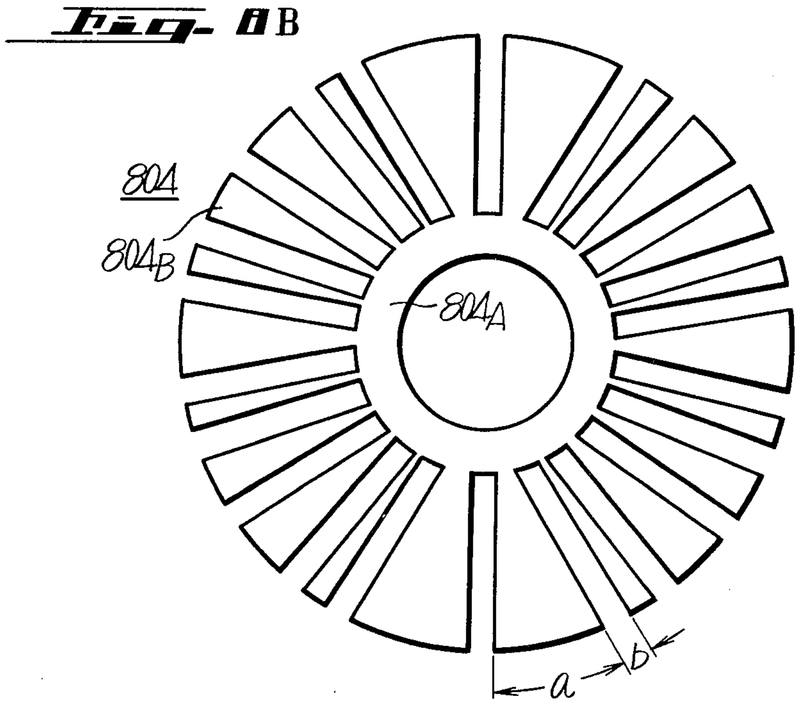
FIG. 8B is an end view of the spacer illustrated in FIG. 8A prior to application to the deflection yoke.

FIGS. 8A and 8B, which are similar to FIGS. 7A and 7B, illustrate an annular separator or spacer member 804 according to still another embodiment. This spacer 804 is also formed of a plastic material and includes an annular coupling portion 804A having substantially the same diameter as that of the smaller open end portion of magnetic core 1 and a plurality of arms 804B formed integrally with the coupling portion 804A and flaring therefrom in correspondence with the shape of the outer surface of core 1, with spaces *b* between arms 804B being equal to the widths of the windings $L_1$ to $L_{22}$. Annular coupling portion 804A is mounted on the marginal edge of the smaller end portion of magnetic core 1 and arms 804B extend therefrom so as to be interposed between adjacent windings $L_1$ to $L_{22}$ to define the predetermined spacings between adjacent windings. Coupling portion 804A is also provided with a plurality of terminals 805 which are adapted to interconnect windings $L_1$ to $L_{22}$ and deflection current sources SV and SH in accordance with either of the above described circuit diagrams of FIGS. 3 and 4.

Figure 9A:
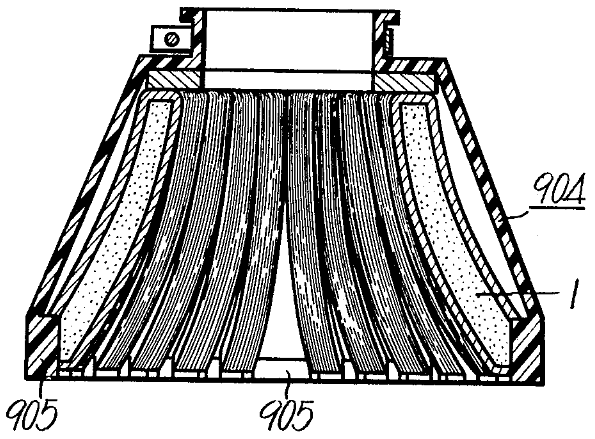
FIG. 9A is an axial sectional view of the deflection yoke of the present invention similar to FIG. 2, but showing the yoke in conjunction with another embodiment of the spacer member.
Figure 9B:
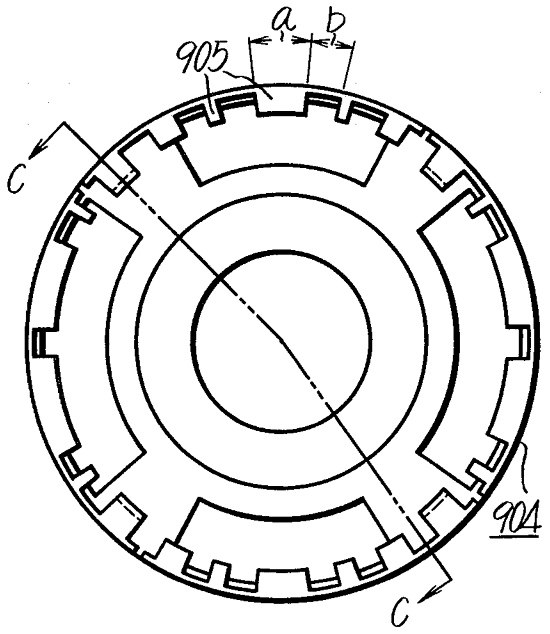
FIG. 9B is an end view of the spacer member illustrated in FIG. 9A.
Figure 9C:
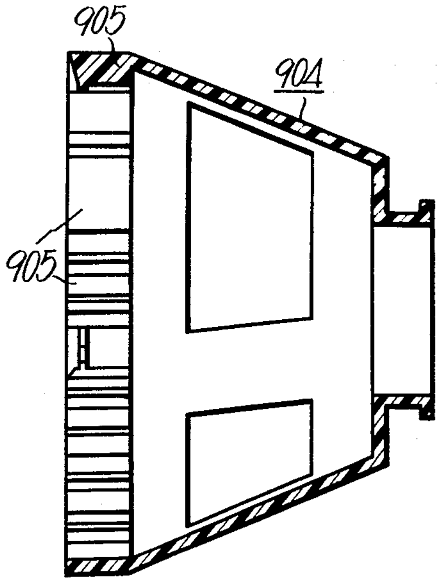
FIG. 9C is a sectional view taken on line C—C of FIG. 9B.

FIGS. 9A to 9C illustrate a winding spacing member 904 according to still another embodiment of the present invention in the form of an open-ended, cup-shaped holder for securing the deflection yoke to the color cathode ray tube. Holder member 904 is a generally conical member which is adapted to enclose the correspondingly shaped magnetic core 1 and has a plurality of projections 905 formed on its inner surface to define the predetermined spacings between adjacent windings. Projections 905 are located at intervals *b* on the larger open end portion of the holder, which intervals *b* correspond to the widths of the windings $L_1$ to $L_{22}$, and the projections 905 have widths *a* corresponding to the predetermined spacing of the windings. The intervals or spaces *b* between adjacent projections 905 receive windings $L_1$ and $L_{22}$ in fixed relation between adjacent projections 905.

Figure 10A:
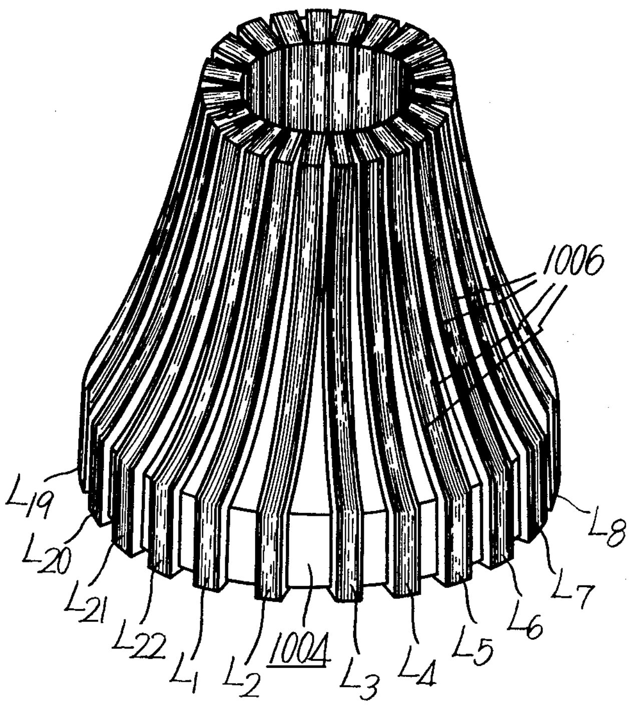
FIG. 10A is a view similar to FIG. 7A of the deflection yoke of the present invention in conjunction with yet another embodiment of the annular spacer.
Figure 10B:
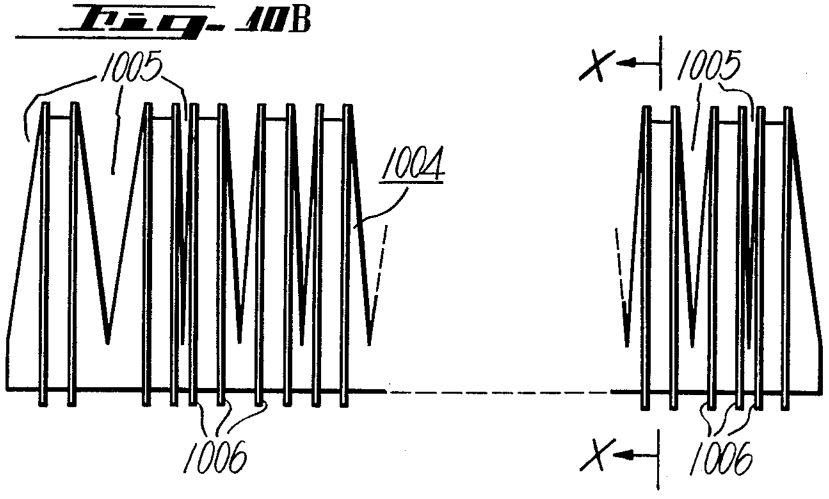
FIG. 10B is an expanded view with parts broken away of the spacer illustrated in FIG. 10A.
Figure 10C:
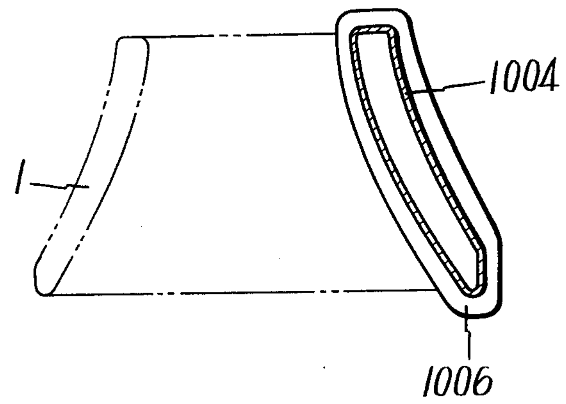
FIG. 10C is a fragmentary sectional view taken on line X—X of FIG. 10B and showing the magnetic core in broken lines.

FIGS. 10A to 10C illustrate a winding spacer member 1004 according to still another embodiment of the present invention wherein spacer 1004 is formed as a generally flattened tubular plastic sleeve having a hollow interior portion corresponding in cross section, as seen in FIG. 10C, substantially to the cross section of magnetic core 1. Initially, tubular member 1004 is formed substantially straight, as illustrated in FIG. 10B, having cutouts 1005 therein whereby the sleeve may be curved to conform to the shape of the magnetic core 1, which in this embodiment is formed as a two-piece element in order to be placed within the hollow interior of member 1004. A plurality of flanges 1006 project from member 1004 to define the predetermined widths and spacings of windings $L_1$ to $L_{22}$. Prior to insertion of core 1 within member 1004 windings $L_1$ to $L_{22}$ are each wound on the spacer member between adjacent flanges 1006, and thence the divided core halves are inserted into tubular member 1004 which, due to its inherent flexibility and the cutouts 1005, is circularly curved to conform to the shapes of the core halves, in the manner shown in FIG. 10A. After this operation is completed the core halves are fixedly assembled in any conventional manner to provide a completed electron beam deflection yoke.

With the use of annular spacer members such as those illustrated in FIGS. 6 to 10, the spacings between adjacent windings are strictly defined according to the predetermined pattern and they are firmly held in position, so that the desired horizontal and vertical deflection magentic fields can be easily and accurately produced. Accordingly, this construction eliminates the necessity of compensation of convergence of the electron beams and, further, avoids dispersion in the characteristics of the deflection coil or yoke.

Moreover, electron beam deflection yokes in accordance with the present invention are readily assembled and manufactured by placing spacing members between adjacent windings, as in the embodiments of FIGS. 6 to 9, or by winding the windings on a tubular member and inserting the core into the tubular member as in the embodiment of FIG. 10.

Deflection yokes constructed in accordance with the present invention are smaller than deflection coil devices of the previous proposed types which have horizontal and vertical deflection windings wound on the core in layers and the deflecmagnetic fields of predetermined intensity produced by the yokes of the present invention can be achieved with smaller deflection currents. It is also contemplated that alteration of the widths of various projections on the spacing members will enable variations in the horizontal and vertical magnetic fields of the deflection coil device, so that the deflection coil device of this invention can be applied to various cathode ray tubes without changing the design of the windings or the magnetic core.

Although illustrative embodiments of the invention have been described herein with reference to the accompanying drawings, it is to be understood that the invention is not limited to those precise embodiments and that various changes and modifications may be effected thereby by one skilled in the art without departing from the scope of spirit of this invention.

What is claimed is:

1. In a color cathode ray tube having a color phosphor screen, an electron gun assembly for producing electron beams to scan said screen, and horizontal and vertical deflection current sources; an electron beam deflection yoke comprising an annular magnetic core receiving the neck portion of said tube and a plurality of separate windings toroidally wound in a generally axial direction about the periphery of said core in a predetermined spaced pattern, said separate windings each having a like number of turns, said windings defining first, second and third groups of windings which are respectively disposed at opposite side regions of said core, at top and bottom regions of said core and at regions of said core intermediate said top and bottom regions and said side regions, and circuit means respectively connecting said first and second groups of windings with said horizontal deflection current source and said vertical deflection current source and each winding of said third group of windings with both said horizontal and vertical deflection current sources whereby horizontal and vertical magnetic fields are established within said yoke and said color cathode ray tube for achieving accurate scanning of the screen by said electron beams.

2. In a color cathode ray tube having a color phosphor screen, an electron gun assembly for producing electron beams to scan said screen, and horizontal and vertical deflection current sources; an electron beam deflection yoke comprising an annular magnetic core receiving the neck portion of said tube and a plurality of separate windings toroidally wound in a generally axial direction about the periphery of said core in a predetermined spaced pattern, said windings defining first, second and third groups of windings which are respectively disposed at opposite side regions of said core, at top and bottom regions of said core and at regions of said core intermediate said top and bottom regions and said side regions, and circuit means including a bridge circuit having four sides at least some of which are constituted by the separate windings in said third group and first and second pairs of opposed connection points at which said sides are joined, said first group of windings and said horizontal deflection current source being connected to said first pair of opposed connection points of said bridge circuit and said second group of windings and said vertical deflection current source being connected to said second pair of opposed connection points of said bridge circuit whereby horizontal and vertical magnetic fields are established within said yoke and said color cathode ray tube for achieving accurate scanning of the screen by said electron beams.

3. An electron beam deflection yoke in a color cathode ray tube as defined in claim 2; wherein said separate windings in said third group constitute all four sides of said bridge, the windings in said first group are connected in series between said first pair of opposed connection points and the windings in said second group are arranged in two sets of windings connected in parallel to each other between said second pair of opposed connection points.

4. An electron beam deflection yoke in a color cathode ray tube as defined in claim 2; wherein said windings in said third group form two of said sides of said bridge circuit, said bridge circuit includes a pair of capacitors in the two other sides thereof, said separate windings in said first group are connected in series with said horizontal deflection current source between said first pair of opposed connection points which are located intermediate said two other sides including said capacitors and said two sides constituted by said third group of windings, and the windings in said second group are connected in parallel with said vertical deflection current source between said second pair of opposed connection points.

5. In a color cathode ray tube having a color phosphor screen, an electron gun assembly for producing electron beams to scan said screen, and horizontal and vertical deflection current sources; an electron beam deflection yoke comprising an annular magnetic core receiving the neck portion of said tube and a plurality of separate windings toroidally wound in a generally axial direction about the periphery of said core in a predetermined spaced pattern, said windings defining first, second and third groups of windings which are respectively disposed at opposite side regions of said core, at top and bottom regions of said core and at regions of said core intermediate said top and bottom regions and said side regions, two of said windings in said second group being positioned at diametrically opposed locations which are centered at the top and bottom, respectively, of said core and the remainder of said windings being arranged symmetrically at opposite sides of the vertical plane containing said two opposed windings and also symmetrically above and below the horizontal median plane of said core, and circuit means respectively connecting said first and second groups of windings with said horizontal deflection current source and said vertical deflection current source and each winding of said third group of windings with both said horizontal and vertical deflection current sources whereby horizontal and vertical magnetic fields are established within said yoke and said color cathode ray tube for achieving accurate scanning of the screen by said electron beams.

6. In a color cathode ray tube having a color phosphor screen, an electron gun assembly for producing electron beams to scan said screen, and horizontal and vertical deflection current sources; an electron beam deflection yoke comprising an annular magnetic core receiving the neck portion of said tube and a plurality of separate windings toroidally wound in a generally axial direction about the periphery of said core in a predetermined spaced pattern, spacing means on said core for maintaining said predetermined spaced pattern of said windings, said windings defining first, second and third groups of windings which are respectively disposed at opposite side regions of said core, at top and bottom regions of said core and at regions of said core intermediate said top and bottom regions and said side regions, and circuit means respectively connecting said first and second groups of windings with said horizontal deflection current source and said vertical deflection current source and each winding of said third group of windings with both said horizontal and vertical deflection current sources whereby horizontal and vertical magnetic fields are established within said yoke and said color cathode ray tube for achieving accurate scanning of the screen by said electron beams.

7. An electron beam deflection yoke in a color cathode ray tube as defined in claim 6; wherein said spacing means comprises an annular member having a plurality of projections of different widths corresponding to said predetermined spacing, each of said projections extending between respective adjacent windings to maintain said predetermined spaced pattern.

8. An electron beam deflection yoke in a color cathode ray tube as defined in claim 7; wherein said annular member has terminal means included in said circuit means and by which said windings are connected to each other and to said horizontal and vertical deflection current sources.

* * * * *